US006873604B1

(12) United States Patent
Surazski et al.

(10) Patent No.: US 6,873,604 B1
(45) Date of Patent: Mar. 29, 2005

(54) METHOD AND APPARATUS FOR TRANSITIONING COMFORT NOISE IN AN IP-BASED TELEPHONY SYSTEM

(75) Inventors: Luke Surazski, Santa Clara, CA (US); Michael Knappe, Sunnyvale, CA (US); Pascal Huart, Bedford, TX (US)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 09/629,032

(22) Filed: Jul. 31, 2000

(51) Int. Cl.[7] ............................................. H04L 12/16
(52) U.S. Cl. .................................. 370/271; 370/395.52
(58) Field of Search ........................... 370/271, 395.52, 370/443, 444, 445, 528; 709/208, 210, 214, 215, 224, 225, 226

(56) References Cited

U.S. PATENT DOCUMENTS

| | | | | |
|---|---|---|---|---|
| 4,864,561 A | * | 9/1989 | Ashenfelter et al. | 370/435 |
| 5,537,509 A | * | 7/1996 | Swaminathan et al. | 704/228 |
| 5,657,422 A | * | 8/1997 | Janiszewski et al. | 704/229 |
| 5,787,388 A | * | 7/1998 | Hayata | 704/215 |
| 5,794,199 A | * | 8/1998 | Rao et al. | 704/258 |
| 5,978,760 A | * | 11/1999 | Rao et al. | 704/226 |
| 6,282,182 B1 | * | 8/2001 | Pecen et al. | 370/336 |
| 6,577,862 B1 | * | 6/2003 | Davidson et al. | 370/433 |

FOREIGN PATENT DOCUMENTS

| | | | | |
|---|---|---|---|---|
| EP | 665530 A1 | * | 8/1995 | G01L/3/02 |
| EP | 694903 A2 | * | 1/1996 | G01L/5/00 |

OTHER PUBLICATIONS

Mouly, Michel et al. "The GSM System for Mobile Communications". Cell & Sys Publishers. 1992. pp. 161–165.*
Vahatalo, A. et al. "Voice Activity Detection for GSM Adaptive Multi-rate Codec", IEEE Workshop on Speech Coding Proceedings, 1999. Porvoo, Finland. Jun 20–23, 1999. pp. 55–57.*
W. Witowsky, "White Paper: IP Telephone Design and Implementation Issues", [Internet] http://www.telogy.com/our_products/golden_gateway/IPphone.html, pp. 1–13 printed Jul. 8, 2000.

* cited by examiner

*Primary Examiner*—John Pezzlo
*Assistant Examiner*—Donald L Mills
(74) *Attorney, Agent, or Firm*—Sierra Patent Group, Ltd.

(57) ABSTRACT

A method is disclosed, where the RX unit of an IP telephone waits for a first silence indication packet to be received. When the first silence indication packet is received, the RX begins attenuating incoming packets. The rate of attenuation may occur at a rate responsive to an indication provided by the TX unit. The RX unit also mixes comfort noise with the attenuated incoming packets. The RX unit the waits for a second silence indication packet to be received. When the second silence indication is received the RX unit mixes in comfort noise at a level responsive to an indication provided by the TX unit. The RX units then waits for voice packets to be received from the TX unit. When normal voice activity resumes, the RX unit stops the generation of comfort noise and begins playing voice packets again.

15 Claims, 6 Drawing Sheets

FIG. 4
Present Invention (TX Unit)

FIG. 5
Present Invention

FIG. 6
Present Invention

METHOD AND APPARATUS FOR TRANSITIONING COMFORT NOISE IN AN IP-BASED TELEPHONY SYSTEM

BACKGROUND OF THE INVENTION

1. Field of the Invention

The present invention relates to telephony. In particular, the present invention relates to eliminating or minimizing the transition that occurs when real background noise is replaced by comfort noise in a voice over IP terminal such as a voice over IP analog or digital gateway, or voice over IP telephones.

2. The Prior Art

Background

The widespread acceptance and use of the internet has generated much excitement, particularly among those who see the Internet as a possible substitute for the traditional telephone system. As the backbone of the Internet continues to be upgraded and expanded, the promise of a low-cost substitute to the traditional PBX system may now be realized.

One type of Internet-based telephony system that is gaining acceptance is IP telephony, which transfers voice information over the Internet Protocol (IP) of the TCP/IP protocol suite. While many standards exist, such as Voice over Packet (VOP) for Frame Relay and ATM networks, as used herein the term "IP telephony" will be used to designate voice over any packet-based network. In IP telephony, a user wishing to communicate uses an IP telephone, which is a device which transports voice over a network using data packets instead of the traditional switched circuits of a voice only network.

Figure 1:
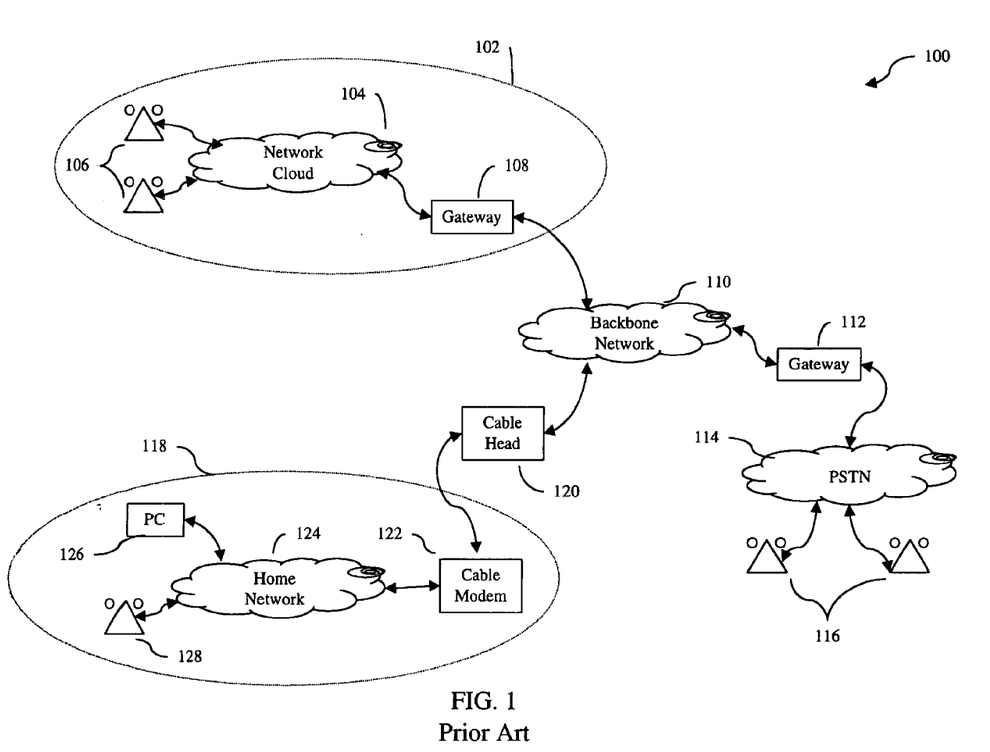
FIG. 1 is a prior art diagram of an IP telephone communications system.

FIG. 1 shows an IP telephony system 100 of the prior art. System 100 includes a business system 102 configured to provide IP telephony in an enterprise environment. Business system 102 may include a network 104, such as a corporate Ethernet LAN, to which a plurality of IP telephones 106 may be operatively coupled to network 104 using hardware and software standard in the art. To couple the business system 102 to the outside world, typically a gateway 108 standard in the art is provided and operatively coupled between network 104 and backbone network 110.

Backbone network 110 may be any packet-based network standard in the art, such as IP, Frame Relay, or ATM. To provide voice communications to legacy POTS phones, typically a gateway 112 is provided, which may be a VoP gateway. Gateway 112 provides access to the Public Switched Telephone Network (PSTN) 114. Through PSTN 114, voice-only communications may be provided to legacy POTS phones 116.

The system 100 of FIG. 1 also includes an example of a broadband residential system 118. To reach individual residences, typically local ISP providers provide a cable or DSL head end 120 standard in the art. An individual wishing to utilize the ISP's service may then employ a cable modem or DSL modem 122 coupled to the user's home LAN 124. The user's home LAN may be provided by a home PC 126 configured to run software standard in the art such Microsoft Windows®. The user may then operatively couple an IP telephone 128 to the LAN 124.

Thus, in the system 100 of FIG. 1, IP telephones 106 in business system 102 may communicate by voice with other similar business systems similarly configured with IP telephones. For a business enterprise, communication by IP telephony may be advantageous because the need for a traditional PBX system can be eliminated. Furthermore, an IP telephony system is scalable and may be upgraded along with the enterprise's network system.

Likewise, the residence of system 118 may communicate by voice to a POTS phone 116 using 1P telephone 128. From the view of the home user, the communication of FIG. 1 is advantageous because the communication operates over the backbone network 110 without accessing traditional long-distance service providers.

Figure 2:
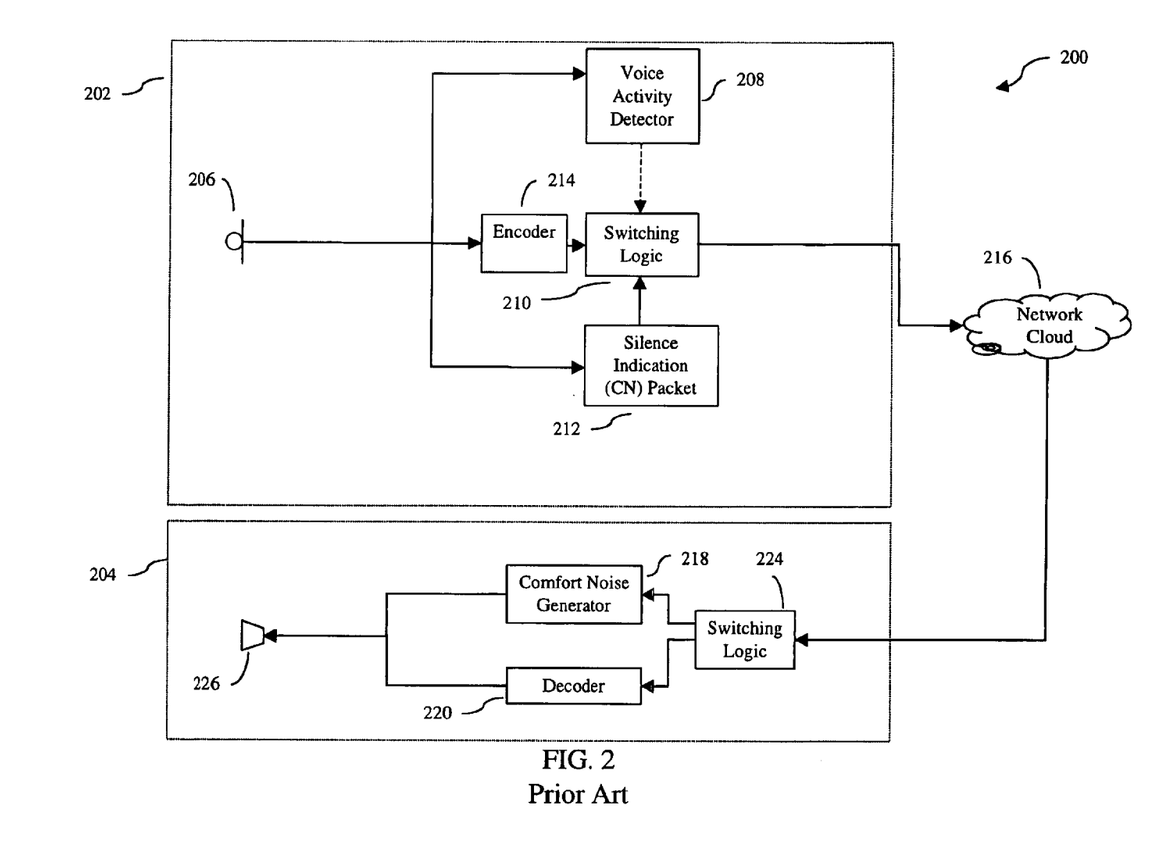
FIG. 2 is a prior art detailed diagram of an EP telephone communications system.

FIG. 2 is conceptual block diagram of a prior art IP telephone system 200 including a TX unit 202 of a transmitting IP telephone standard in the art and a RX unit 204 of a receiving IP telephone standard in the art. TX unit 202 and RX unit 204 are shown operatively coupled to each other through a network cloud 216. For the sake of clarity, elements of a typical IP telephone not essential to the explanation of the present invention are not shown in the disclosure.

TX unit 202 includes a microphone 206 coupled to a Voice Activity Detector (VAD) 208, a silence indication packet generator 212 and an encoder 214. VAD 208, encoder 214, and silence indication packet source 212 are operatively coupled to each other to provide an output for transmission over network 216.

In operation, the VAD 208 will determine whether there is voice activity present in the signal coming from microphone 206 using methods known in the art. If there is voice activity in the signal, the switching logic will pass the output of the encoder (i.e., a packet stream) for transmission to network cloud 216 using methods standard in the art.

If the VAD 208 determines that there is no voice activity present on the signal coming from microphone 206, then the switching logic 210 will send one or more silence indication packets to network cloud 116. The silence indication packets contain at least a background noise level so that the comfort noise generator 218 on the receive side can generate noise similar in level and character to the actual background noise on the transmit side.

Comfort noise is a prior art solution to save network bandwidth. The prior art methods determined that if there is no voice activity present, then no voice packets should be sent over the network. However, this results in an unnatural silence appearing on the receiving unit, since no packets are being sent. As a result, the prior art methods developed the concept of comfort noise, which presents the listener with generated noise designed to mimic the line noise of traditional legacy telephones when there is no voice activity present. The comfort noise reassures listeners that their connection is still active. As used herein, comfort noise will be used to designate a more specific type of packet than background noise.

Referring still to FIG. 2, RX unit 204 includes a comfort noise generator 218 operatively coupled to a decoder 220. The comfort noise generator 218 and decoder 220 are both operatively coupled to switching logic 224. When the output of TX unit 202 has been transmitted over network 216, it will be received by RX unit 204, and presented to a decoder 220 and a comfort noise generator 218 using methods standard in the art.

If the switching logic receives an encoded voice packet it routes it to the decoder which then outputs the decoded audio signal to the speaker 226. If the switching logic receives a silence indication packet it routes it to the comfort noise generator 218 which then generates comfort noise to the speaker 226 until further voice packets are received. Typically, the CF comprises white or pink noise.

While the systems of FIGS. 1 and 2 perform well for there intended purpose, some disadvantages have been encountered when compared to legacy phone systems. For example, some users of IP telephones have reported inconveniences when using an IP telephone and periods of silence occur.

Figure 3:
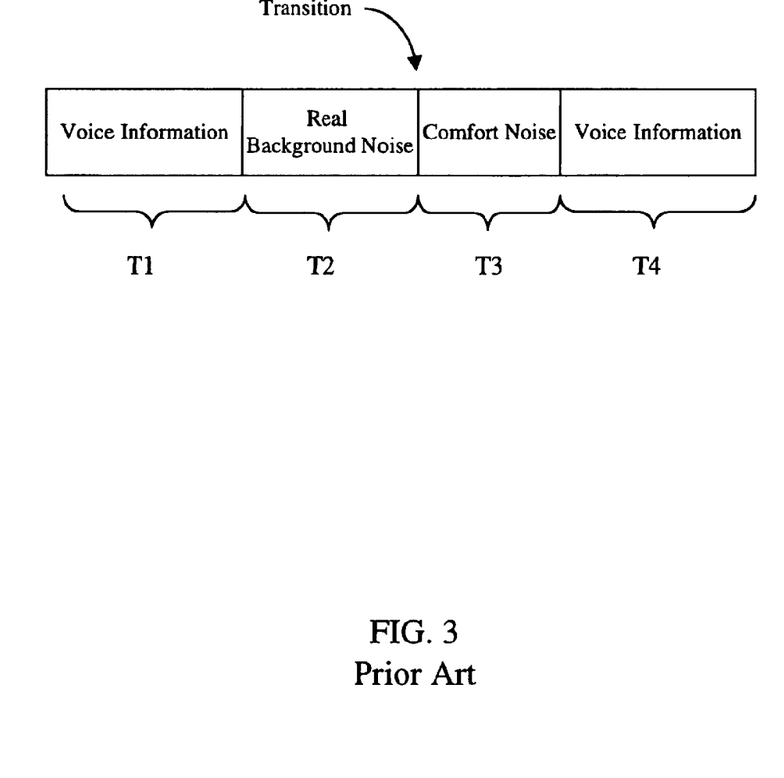
FIG. 3 is a prior art diagram of IP telephony data.

FIG. 3 is a prior art conceptual diagram showing IP telephony data flow received by a receiving unit. The blocks of FIG. 3 represents the information present during time intervals T1 through T4.

In time interval T1, the receiving unit may be receiving voice information while engaging in a conversation. When the conversation quiets down, the receiving unit may then receive real background noise in time interval T2.

However, in prior art systems, if no voice information is present for a predetermined time, then the TX unit will begin to send comfort noise packets in time interval T3.

Finally, the conversation may resume in time interval T4, and the receiving unit will again hear voice information. Thus, the listening parties utilizing IP telephones of the prior art will perceive an abrupt transition between real background noise and comfort noise in the transition from time interval T2 to time interval T3. This transition typically sounds unnatural because comfort noise rarely models the actual background noise very well. Typically many highly noticeable frequency components will be missing. The transition between interval T3 and T4 is less noticeable as the listener tends to focus on the voice of the speaker rather than the background noise.

Hence there is a need for a method and apparatus to eliminate or minimize the transition that occurs when real background noise is replaced by comfort noise in an IP telephone.

BRIEF DESCRIPTION OF THE INVENTION

The invention satisfies the above needs. The present invention relates to telephony. In particular, the present invention relates to eliminating or minimizing the transition that occurs when real background noise is replaced by comfort noise in a voice over IP terminal such as a voice over IP analog or digital gateway, or voice over IP telephones.

A method is disclosed herein where the TX unit of an IP telephone detects whether silence exists; if silence is detected, a first silence indication packet is sent while the TX unit continues to send packets consisting of actual background noise; the TX unit then waits for a predetermined amount of time to pass. The TX unit then sends a second silence indication packet after the predetermined amount of time passes. The TX unit then waits for voice activity to resume. The TX unit then resumes normal packet activity after the voice activity is detected.

A second method is disclosed, where the RX unit waits for a first silence indication packet to be received. When the first silence indication packet is received, the RX begins attenuating incoming packets. The rate of attenuation may occur at a rate responsive to an indication provided by the TX unit. The RX unit also mixes attenuated comfort noise with the attenuated incoming packets. The RX unit then waits for a second silence indication packet to be received. When the second silence indication is received the RX unit generates comfort noise at a level responsive to an indication provided by the TX unit. The RX units then waits for voice packets to be received from the TX unit. When normal voice activity resumes, the RX unit stops the generation of comfort noise and begins playing voice packets again.

By using IP telephones configured according to the present invention, listeners will not experience the abrupt transition between real background noise and comfort noise which is heard in IP telephones of the prior art.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

Figure 4:
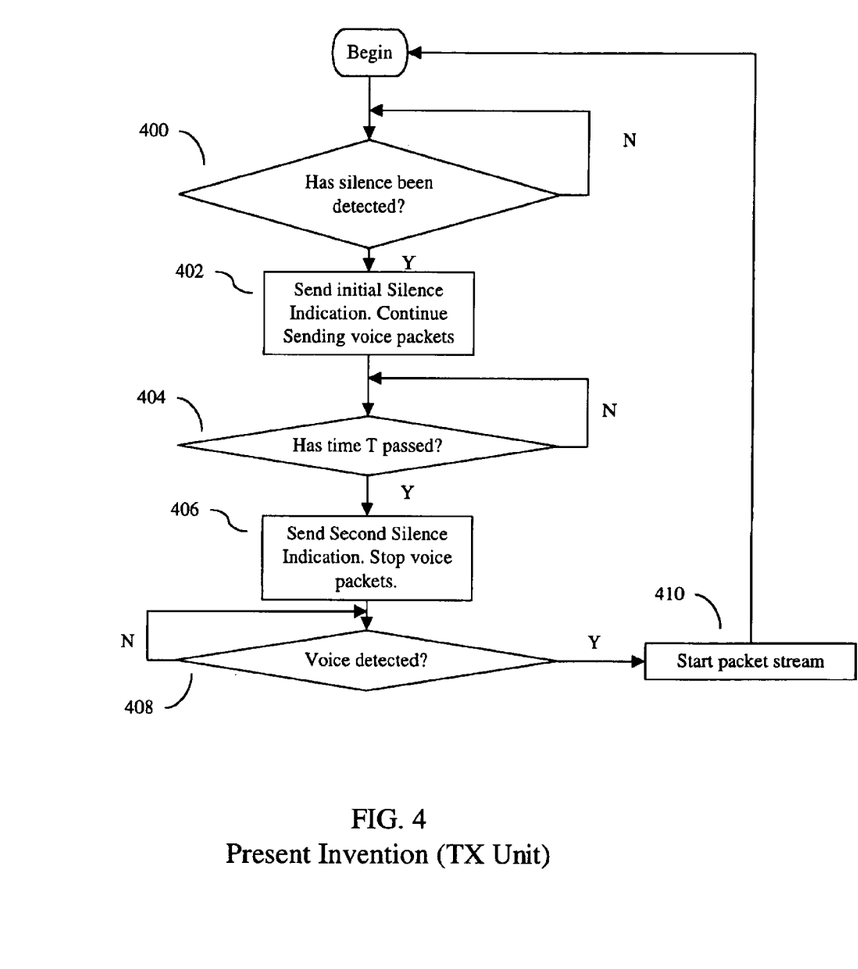
FIG. 4 is a flowchart of a method according to the present invention.

Referring now to FIG. 4, a flowchart of one preferred embodiment according to the present invention is shown. In a preferred embodiment of the present invention, the process of FIG. 4 may be performed using hardware and software standard in the art within the switching logic of an IP telephone. The process of FIG. 4 focuses on the acts performed by a TX unit of an IP telephone according to the present invention. It is contemplated that the means for performing the acts described in FIG. 4 may be performed with IP telephony hardware and software standard in the art.

The process of FIG. 4 begins with query 400, where the TX unit waits to detect silence. If silence is not detected, then the IP telephone will operate as normal as indicated by the loop of query 400.

If silence is detected in query 400, then the process will move to act 402, where the TX unit will send an initial, or first, silence indication packet (SID) to the RX unit.

Simultaneously, the TX unit will continue to send voice packets to the RX unit.

The process of FIG. 4 then moves to query 404, where the TX determines whether a predetermined amount of time T has elapsed. In a preferred embodiment of the present invention, time T comprises an amount of time sufficient for the RX unit to attenuate the real background noise through a process which will be described below. In an exemplary non-limiting embodiment of the present invention, time T comprises approximately two seconds.

In a further exemplary non-limiting embodiment of the present invention, the first silence packet sent in act 402 may also contain an indication therein which contains the background noise level sensed by the TX unit. In yet an exemplary non-limiting embodiment of the present invention, the first silence indication may also contain an indication therein which indicates the rate at which the real background noise should be attenuated. Such a rate may also be computed from the formula:

$$\text{Rate} = \text{Background Noise } (dB)/\text{Time } (sec.)$$

To maintain a consistent level of background noise, the gain of the comfort noise and the gain of the real background noise should be adjusted in an exponential function such that at any point in time the following formula holds true:

$$\text{Maximum Level of Background Noise as specified in the first Silence Indication Packet } (dB) = \text{Current Background Noise Level } (dB) * \text{Current Comfort Noise Level } (dB)$$

After the predetermined time T has elapsed, the process of FIG. 4 then moves to act 406, where a second silence indication packet is sent to the RX unit. Simultaneously, the TX unit will stop sending voice packets to the RX unit.

The process then moves to query 408, where the TX unit waits until voice information is detected. When voice information is detected, the TX unit will start sending a packet stream to the RX unit in act 410. The process of FIG. 4 then returns back to query 400, and the process of FIG. 4 repeats as necessary.

Figure 5:
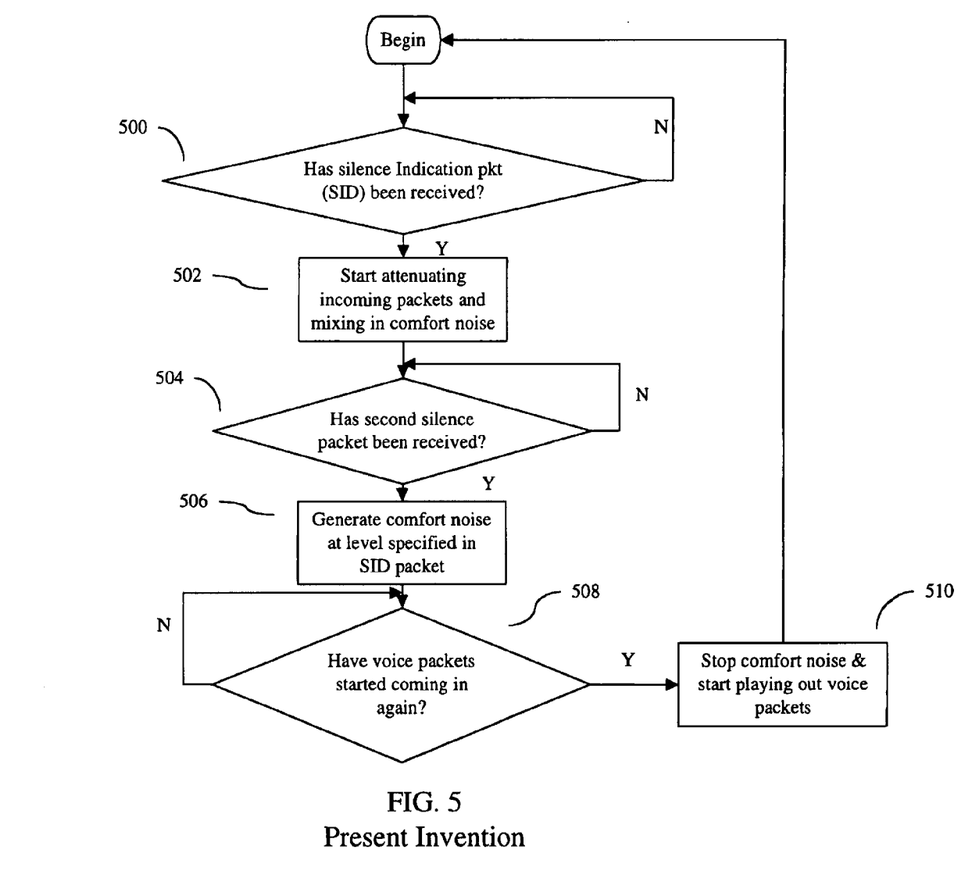
FIG. 5 is a diagram of IP telephony data according to the present invention.

FIG. 5 is a flowchart of another method according to the present invention. FIG. 5 focuses on the RX unit of an IP telephone operating according to the present invention. It is contemplated that the means for performing the acts described in FIG. 5 may be performed with IP telephony hardware and software standard in the art.

The process of FIG. 5 begins with query 500, where the RX unit waits to receive an initial, or first, silence indication packet (SID). When the RX unit receives a first silence packet, the RX unit will begin attenuating (act 502) the background noise contained in the incoming packets and mixing in comfort noise according to the present invention.

In a preferred embodiment of the present invention, the attenuating and mixing acts performed according to the present invention may be performed by switching logic of the RX unit using hardware and software standard in the art.

In an exemplary non-limiting embodiment of the present invention, the RX unit will attenuate the information contained in the incoming packets, and mix in comfort noise at a rate responsive to information contained in a silence indication packet. For example, the present invention may attenuate the real background noise at a rate specified in the first silence indication packet.

The process then moves to query 504, where the RX unit waits for a second silence indication packet. When the RX unit receives a second silence indication packet from the TX unit, the RX unit will then generate comfort noise. In an exemplary non-limiting embodiment of the present invention, the RX unit will generate comfort noise at a level responsive to information contained in a silence indication packet sent by the TX unit. For example, the RX unit may generate comfort noise in act 506 at a level specified by an indication contained in the first silence indication packet.

The process of FIG. 5 then moves to query 508, where the RX unit waits for voice packets to be received from the TX unit. When voice packets are received, the RX unit will begin playing out the voice packets in act 510, and the process of FIG. 5 returns to query 500, and the process of FIG. 5 may repeat as necessary.

Figure 6:
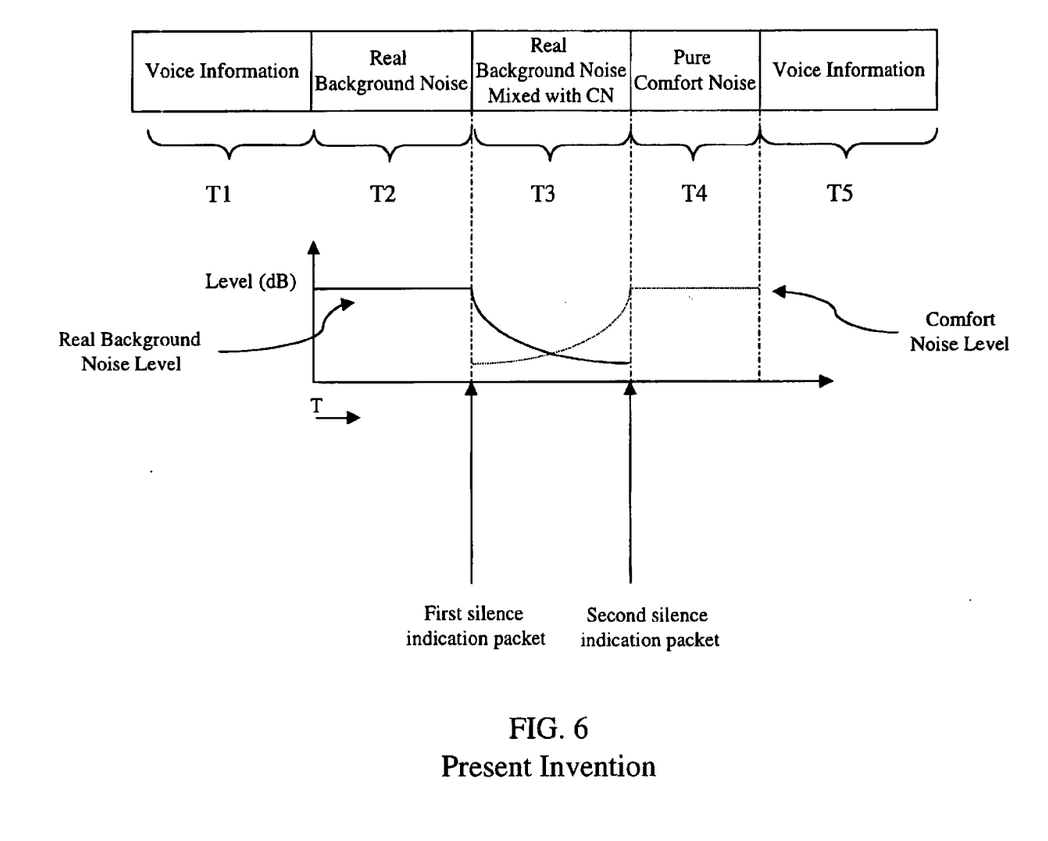
FIG. 6 is a flowchart of a method according to the present invention.

FIG. 6 is a conceptual diagram showing data flow according to one aspect of the present invention. FIG. 6 represents the scenario shown in FIG. 3, but highlights the results achieved by the present invention. It should be noted that the sequence of events shown in FIG. 6 is but one example and is provided for illustrative purposes only, and many different sequences are possible within the scope of the present invention.

FIG. 6 also includes a graph representing the levels of background noise and comfort at corresponding points of time during the flow of data.

In time interval T1, the receiving unit may be receiving voice information while engaging in a conversation. When the conversation quiets down, the receiving unit may then receive real background noise in time interval T2. As can be seen by inspection of the graph of FIG. 6, the real background noise will be at a maximum level during time interval T2.

At the beginning of time interval T3, a first silence indication packet will be received by the RX unit. During the time interval T3, the level of the real background noise will be gradually attenuated, and the level of comfort noise will be gradually raised, as can be seen by the graph of FIG. 6.

At the end of time interval T3, the RX unit will receive a second silence indication packet. After the receipt of the second silence indication packet, the RX unit will generate pure comfort noise at full amplitude during time interval T4.

When voice information is present again, voice packets will be played out during time interval T5.

It should be noted that the data transmission according to the present invention may be characterized by a time interval in which a mix of real background noise and comfort noise is present.

Thus, the listening parties utilizing IP telephones according to the present invention will not hear the abrupt transition between real background noise and comfort noise which was present in IP telephones of the prior art.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for reducing the transition that occurs when real background noise is replaced by comfort noise in an IP telephone, said IP telephone having a TX unit, said method comprising:

determining, by said TX unit of said IP telephone, whether silence exists;

if silence is detected, then sending, by said TX unit, a first silence indication while said TX unit continues to send voice packets, said first silence indication indicating the rate at which the real background noise should be attenuated;

waiting, by said TX unit, for a predetermined amount of time to pass;

sending, by said TX unit, a second silence indication packet after said predetermined amount of time passes;

waiting, by said TX unit, for voice activity to be detected; and starting, by said TX unit, normal packet activity after said voice activity is detected.

2. The method of claim 1, wherein said first silence indication has an indication therein which contains the background noise level sensed by the TX unit.

3. The method of claim 1, wherein said rate is determined according to the formula Rate=Background Noise (dB)/Time (sec.).

4. The method of claim 1, wherein said predetermined amount of time comprises an amount of time sufficient for the RX unit to attenuate the real background noise.

5. A method for reducing the transition that occurs when real background noise is replaced by comfort noise in an IP telephone, said IP telephone having a RX unit, said method comprising:

waiting, by said RX unit, for a first silence indication packet to be received while said RX unit is receiving incoming packets, said first silence identification packet providing a rate at which incoming packets are to be attenuated;

attenuating, by said RX unit, said incoming packets when said first silence identification packet is received from a TX unit, said attenuation occurring at said rate provided by said first silence identification packet;

mixing, by said RX unit, comfort noise with said attenuated incoming packets;

waiting, by said RX unit, for a second silence indication packet to be received, said second silence identification packet providing a level at which comfort noise is generated;

generating, by said RX unit, comfort noise at said level responsive to an indication provided by said second silence indication packet;

waiting, by said RX unit, for voice packets to be received from said TX unit; and stopping, by said RX unit, the generation of comfort noise and playing voice packets when voice packets are received by said RX unit.

6. A program storage device readable by a machine, tangibly embodying a program of instructions executable by the machine to perform a method for reducing the transition that occurs when real background noise is replaced by comfort noise in an IP telephone, said method comprising:

determining, by said TX unit of said IP telephone, whether silence exists;

if silence is detected, then sending, by said TX unit, a first silence indication while said TX unit continues to send voice packets, said first silence indication indicating a rate at which the real background noise should be attenuated;

waiting, by said TX unit, for a predetermined amount of time to pass;

sending, by said TX unit, a second silence indication packet after said predetermined amount of time passes;

waiting, by said TX unit, for voice activity to be detected; and starting, by said TX unit, normal packet activity after said voice activity is detected.

7. The program storage device of claim 6, wherein said first silence indication has an indication therein which contains the background noise level sensed by the TX unit.

8. The program storage device of claim 6, wherein said rate is determined according to the formula Rate=Background Noise (dB)/Time (sec.).

9. The program storage device of claim 6, wherein, said predetermined amount of time comprises an amount of time sufficient for the RX unit to attenuate the real background noise.

10. A program storage device readable by a machine, tangibly embodying a program of instructions executable by the machine to perform a method for reducing the transition that occurs when real background noise is replaced by comfort noise in an IP telephone having a RX unit, said method comprising:

waiting, by said RX unit, for a first silence indication packet to be received while said RX unit is receiving incoming packets, said first silence identification packet providing a rate at which incoming packets are to be attenuated;

attenuating, by said RX unit, said incoming packets when said first silence identification packet is received from a TX unit, said attenuation occurring at said rate provided by said first silence identification packet;

mixing, by said RX unit, comfort noise with said attenuated incoming packets;

waiting, by said RX unit, for a second silence indication packet to be received, said second silence identification packet providing a level at which comfort noise is generated;

generating, by said RX unit, comfort noise at said level responsive to an indication provided by said second silence indication packet;

waiting, by said RX unit, for voice packets to be received from said TX unit; and stopping, by said RX unit, the generation of comfort noise and playing voice packets when voice packets are received by said RX unit.

11. An IP telephony apparatus configured for reducing the transition that occurs when real background noise is replaced by comfort noise in an IP telephone, said IP telephony apparatus having a TX unit, said apparatus comprising:

means for determining whether silence exists;

means for sending a first silence indication while said TX unit continues to send voice packets if silence is detected, said first silence indication indicating a rate at which the real background noise should be attenuated;

means for waiting a predetermined amount of time to pass;

means for sending a second silence indication packet after said predetermined amount of time passes;

means for waiting for voice activity to be detected; and means for starting normal packet activity after said voice activity is detected.

12. The apparatus of claim 11, wherein said first silence indication has an indication therein which contains the background noise level sensed by the TX unit.

13. The apparatus of claim 11, wherein said rate is determined according to the formula Rate=Background Noise (dB)/Time (sec.).

14. The apparatus of claim 11, wherein, said predetermined amount of time comprises an amount of time sufficient for the RX unit to attenuate the real background noise.

15. An IP telephony apparatus for reducing the transition that occurs when real background noise is replaced by comfort noise in an IP telephone, said IP telephone having a RX unit, said method comprising:

means for waiting, by said RX unit, for a first silence indication packet to be received while said RX unit is receiving incoming packets, said first silence identification packet providing a rate at which incoming packets are to be attenuated;

means for attenuating, by said RX unit, said incoming packets when said first silence identification packet is received from a TX unit, said attenuation occurring at said rate provided by said first silence identification packet;

means for mixing, by said RX unit, comfort noise with said attenuated incoming packets;

means for waiting, by said RX unit, for a second silence indication packet to be received, said second silence identification packet providing a level at which comfort noise is generated;

means for generating, by said RX unit, comfort noise at said level responsive to an indication provided by said second silence indication packet;

means for waiting, by said RX unit, for voice packets to be received from said TX unit; and means for stopping, by said RX unit, the generation of comfort noise and playing voice packets when voice packets are received by said RX unit.

* * * * *